Figure 1:
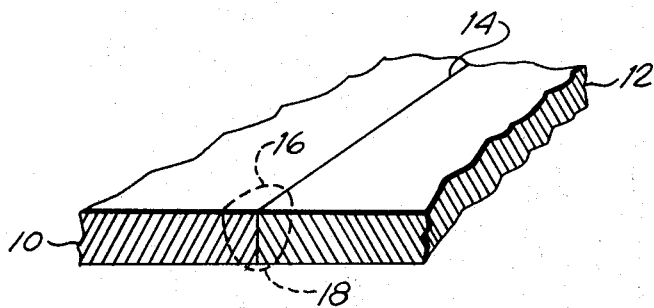

United States Patent

[11] 3,567,899

| [72] | Inventors | William F. Iceland<br>Los Alamitos;<br>Martin E. O'Dor, Downey, Calif. |
|---|---|---|
| [21] | Appl. No. | 538,650 |
| [22] | Filed | Mar. 30, 1966 |
| [45] | Patented | Mar. 2, 1971 |
| [73] | Assignee | North American Rockwell Corporation |

[54] WELD-PENETRATION CONTROL
10 Claims, 4 Drawing Figs.

| [52] | U.S. Cl. | 219/125 |
|---|---|---|
| [51] | Int. Cl. | B23k 9/12 |
| [50] | Field of Search | 219/60.1, 60, 61, 121, 125, 124—125 (PL), 137, 124 |

[56] References Cited
UNITED STATES PATENTS

| 2,089,014 | 8/1937 | Bucknam et al. | 219/155 |
|---|---|---|---|
| 3,128,368 | 4/1964 | Franz et al. | 219/125 |
| 3,262,006 | 7/1966 | Sciaky et al. | 219/125 |
| 3,299,250 | 1/1967 | Vilkas et al. | 219/124 |
| 3,303,321 | 2/1967 | Harmsen et al. | 219/125 |
| 3,335,254 | 8/1967 | Vilkas et al. | 219/60 |
| 3,370,151 | 2/1968 | Normando | 219/125 |

*Primary Examiner*—J. V. Truhe
*Assistant Examiner*—Lawrence A. Rouse
*Attorneys*—William R. Lane, Allan Rothenberg and Sidney Magnes

ABSTRACT: In order to provide improved weld-penetration control, the temperature produced by the welding operation is monitored; and resultant control-signals are used to produce improved welding.

PATENTED MAR 2 1971

3,567,899

SHEET 1 OF 2

INVENTOR.
WILLIAM F. ICELAND
MARTIN E. O'DOR
BY
Sidney Magnes

INVENTOR.
WILLIAM F. ICELAND
MARTIN E. O'DOR
BY
Sidney Magnes 3,567,899

WELD-PENETRATION CONTROL

BACKGROUND

It is well known that there are two principal methods of welding, the first of these being "resistance" welding, and the second method being "fusion" welding. In resistance welding, the two sheets of material to be welded are pressed together, and an electric current is passed between their abutting portions. Due to the fact that there is a relatively high electrical resistance at the butted joint, the passage of electric current through this high resistance develops a great deal of heat; this heat momentarily melting the abutting surfaces so that they may be pressed together with a film of molten material between them. When the flow of electric current is terminated, the momentary film of molten material solidifies, thus producing the welded joint. There are times when the sheets of material must be welded together in an overlapping relationship, rather than in an abutting relationship, and to achieve this result, a series of resistance welds known as "spot welds" may be used.

It will be realized from the above explanation that resistance welding has its advantages, but also has its disadvantages; one disadvantage being, for example, that the electric current that produces the heat for the resistance weld is a pulse-type current, so that the weld is not susceptible to control. Specifically, once the current flow has been initiated, its duration is so short that it is practically beyond the control of the operator or equipment to modify it; and if the electric pulse produces too little heat, an imperfect weld results—whereas if the heat is too great, an overly-large area is undesirably overheated.

In the fusion welding process, two sheets of material are butted together, but rather than producing an instantaneous film between all abutting surfaces, a small portion of the abutting surfaces is melted to produce a small "puddle" of molten material; and this puddle of molten material is progressively moved along the abutting surfaces —the puddle solidifying behind the point at which the puddle is being instantaneously produced. In this way, a weld-puddle of molten material is moved continuously and progressively along the abutting surfaces.

This particular method also has several advantages and disadvantages. One advantage is that, since the weld puddle moves relatively uniformly, it lends itself to a certain amount of control. However, if the weld-puddle becomes too large, it may drop through the area being welded—this being called "drop-through," or a "blow-through" —and thus ruin the workpiece, and necessitating a repair weld.

In fusion arc-welding, two techniques may be used. One of these is known as the TIG (Tungsten-Inert-Gas) welding process, wherein the electrode is formed of tungsten, and the welding area is enveloped in a cloud of inert gas such as argon, helium, or mixtures thereof. Since tungsten is a material that melts at a very high temperature, it readily acts as an electrode that establishes the welding arc; but does not melt and enter into the welding process —i.e., the electrode is not consumed in the welding process. In this case, a "weld-wire" may be fed into the weld-puddle to provide additional material for providing the desired volume for the weld-puddle.

Another class of arc-welding is known as the MIG type (Metal-Inert-Gas), wherein the electrode is formed of a metal that has suitable characteristics to be used as part of the welding material. In this type of arc-welding, the electrode is melted by heat from the welding arc; and the molten electrode-material is directed toward the welding area, where it becomes part of the weld-puddle —i.e., the electrode is consumed in the welding process, and is continually fed toward the workpiece.

In the TIG method of welding, the amount of heat developed is controlled by adjusting the current in the electric arc, this control of current being achieved by suitable control of the power source; whereas in the MIG type of welding, the amount of heat developed is controlled by controlling the electrode feed-rate.

OBJECTS AND DRAWINGS

It is the principal object of the present invention to provide improved welding apparatus and means.

It is another object of the present invention to provide apparatus that controls a fusion-welding operation.

It is a further object of the present invention to provide welding apparatus that monitors the temperature of the weld-puddle, and thus provides improved results.

Figure 2:
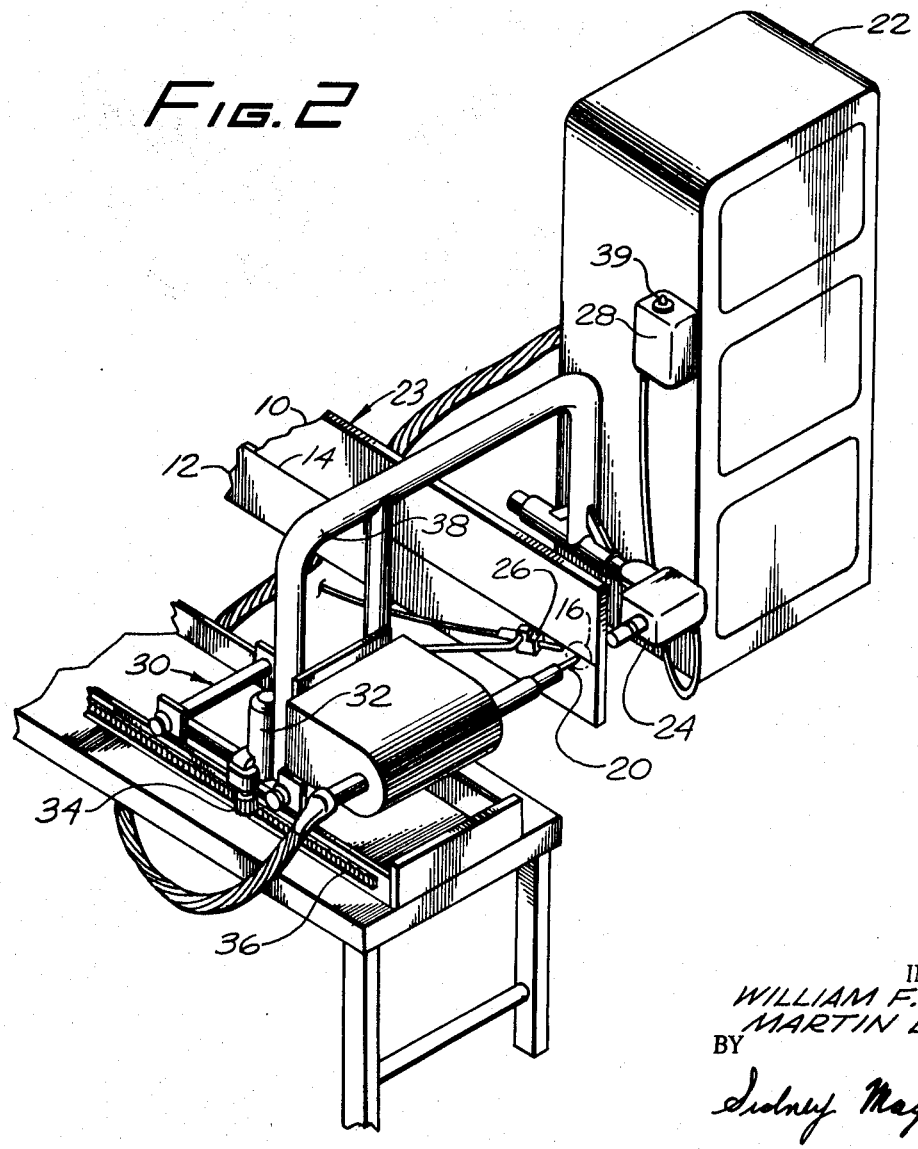
Figure 3:
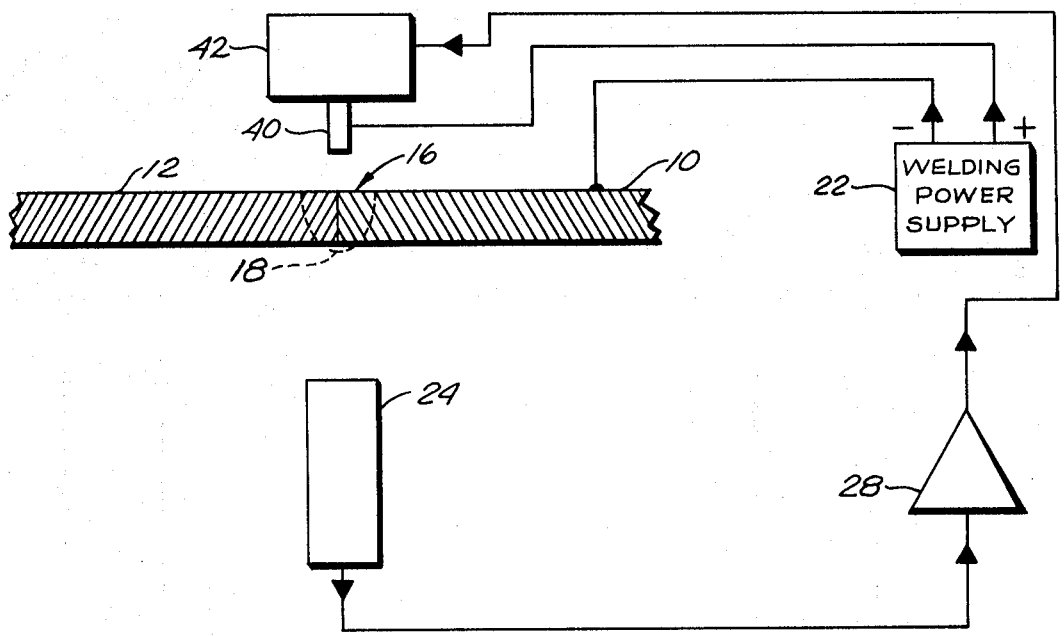
Figure 4:
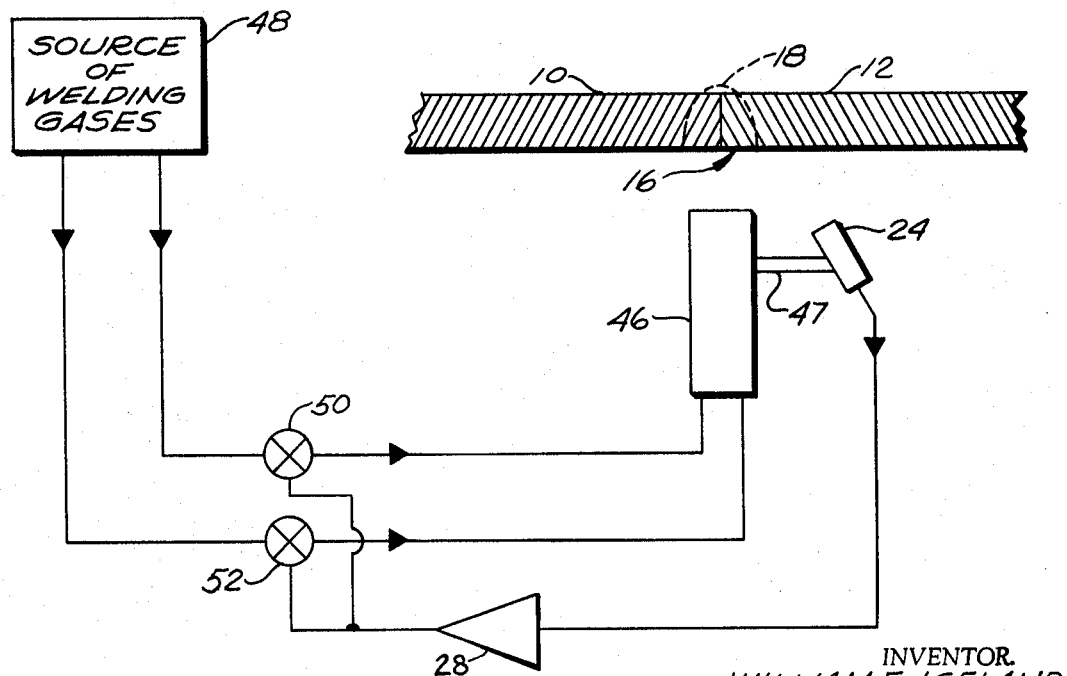

The attainment of these objects and others will be realized from the teachings of the following specification, taken in conjunction with the drawings of which:

FIG. 1 shows a typical fusion welding cross section;
FIG. 2 shows one embodiment of the invention;
FIG. 3 shows another embodiment of the invention;
FIG. 4 shows still another embodiment of the invention.

SYNOPSIS

Broadly speaking, the present invention relates to fusion welding apparatus that produces a moving molten puddle of welding material. It has been found that, in fusion welding, a blow-through is preceded by a rise in temperature of the molten weld-puddle, and —in accordance with the teachings of the present invention —when this temperature exceeds a given value, the power applied to the welding apparatus is reduced, to minimize or eliminate the danger of a "blow-through."

INTRODUCTION

FIG. 1 shows a cross-sectional view of a workpiece comprising two members 10 and 12 that have been abutted at area 14 in order that they may be fusion-welded together. By means to be discussed later, heat is applied to a small area of joint 14; the heat producing a molten-weld-puddle 16 that takes a substantially conical shape. Ideally, molten puddle 16 is of such a size and shape that a small convex configuration 18 of molten material is produced at the back of the workpiece being welded; this condition being known as the "weld penetration." The heated area is gradually moved along joint 14, so that molten puddle 16 moves progressively along the junction of the two members. As the molten puddle is moved along, the trailing edge of the weld-puddle solidifies, and —due to convex configuration 18—produces a chain of partially-overlapping arcuate areas along the bottom of joint 14; this solidified configuration being known as the lower "weld bead."

The molten puddle 16 tends to have a concave surface at the top thereof; and if this is undesirable, additional material from a welding-wire may be fed into the molten puddle 16 in order to produce a plane or a convex surface tat the top of the weld-puddle 16. As the weld-puddle moves progressively along joint 14, the trailing edge of the cooling top surface of the weld-puddle also produces a series of partially-overlapping arcuate areas along the top of joint 14; this solidified configuration being known as the upper "weld bead." In a well-formed weld joint, the upper and lower weld beads appear as a series of uniformly-spaced, uniformly-sized, partially-overlapped arcuate surfaces; and the size of the beads indicates the size of the molten puddle that produced the weld. Since it is generally undesirable to overheat the workpiece, the resultant weld-beads are preferably as narrow as possible, indicating optimal weld penetration.

There is an exception to this optimal condition, however, in that gaseous inclusions tend to occur in the molten metal, and to thus produce a porous weld. In order to overcome this porosity, the workpiece is slightly overheated, which produces a larger weld-puddle, and therefore greater weld penetration. The larger weld-puddle, in turn, requires a longer time to solidify, and thus permits a longer time for the gaseous inclusions to escape. Thus, under certain conditions, overpenetration —resulting in an enlarged weld-bead —is acceptable; provided that the weld-beads are not too large, and that their uniformity is good.

To summarize, the size of the molten puddle is quite critical, preferably being as small as possible, but sometimes —unavoidably —being relatively large. If the molten puddle is of small size, the surface tension of the molten liquid prevents it from pouring out of the conical hole; whereas if the molten puddle becomes too large —as may occur in the case of overpenetration, the surface tension is not large enough to maintain the liquid in its conical form; and the molten liquid pours out of its conical containment as a blow-through. As indicated previously, when a blow-through occurs, the welding operation becomes discontinuous at that instant, and must be stopped in order to provide a repair that will permit the welding operation to be resumed. The repair is undesirable, since it tends to locally overheat the workpiece, and produces a weaker weld than would occur without the repair.

DESCRIPTION OF THE INVENTION

The disclosed invention senses the danger of a blow-through, and —by electronic means —immediately modifies the welding operation to prevent a blow-through.

Referring now to FIG. 2, there is shown a "TIG" (Tungsten-Inert-Gas) apparatus for arc welding in the so-called "horizontal position" —which means that the welding electrode is in a horizontal position, and the workpiece is in a vertical position. A welding electric power-supply 22 has one output wire connected to the holder of a nonconsumable tungsten welding electrode 20, and has its other output wire connected to workpiece 23, whose members 10, 12 are suitably held in place, fixed relative to each other. In a manner well known to those in the art, an arc is established between the tungsten electrode 20 and the workpiece 23, the arc producing a heated area wherein the material of the workpiece melts to produce a molten weld-puddle 16. In a manner also well known in the art, and not shown, a surrounding atmosphere of inert gas encloses the welding area. As previously described, the tungsten electrode material does not enter into the weld-puddle; a weld-wire being fed into the weld-puddle by means such as a weld-wire feed device 26. As indicated above, the weld-power is controlled by causing power-supply 22 to control the arc current.

In the arrangement illustrated in FIG. 2, the gaseous inclusions in molten puddle 16 tend to rise and become trapped by the upper confinement of the weld-puddle, and have difficulty escaping, so that there is danger of producing a porous weld. In order to improve the welding operation, the workpiece is superheated. This means that the molten puddle 16 is larger than usual, or stated in another way, there is overpenetration of the weld, thus permitting the entrapped gaseous bubbles to escape, as explained above. As previously indicated, however, this also means that the surface tension at the back of the workpiece may not be large enough to maintain the molten puddle 16, which may then run out in a form of a blow-through.

In order to minimize this effect, in accordance with the teachings of the instant inventive concept, the temperature of the weld-puddle is monitored, and used to control the welding operation. Specifically, in this embodiment, the back portion of molten puddle 16 is imaged onto an infrared pickup device 24, whose output is used to modify the welding operation; pickup device 24 being responsive only to infrared radiations, due to its design, or to the use of suitable filters. Due to its optical system, the infrared pickup device "sees" only a very small area of the back surface of the molten puddle 16, this arrangement being used for the following reasons. Under certain conditions, visible light from the arc may penetrate through openings in the abutting surfaces of members 10, 12; and in those cases, the visible light might impinge upon pickup device 24. Under these conditions, it would be undesirable for the pickup device to modify the welding operation, as this shining-through of the light might be a normal occurrence, such as when first starting the welding operation.

Moreover, it has been found that during the crucial overpenetration interval, when there is danger of a blow-through, the size of the molten puddle 16, and its temperature, starts to increase. It has been determined that the increase in size of molten puddle 16 is not necessarily indicative of an incipient blow-through; but that the rise in temperature is a good indication of this danger. Thus, by setting up the pickup device 24 in such a manner as to use infrared radiations to monitor the temperature of the puddle at a very small area, this arrangement obviates modification of the welding operation for any reason except a rise in temperature of the weld-puddle 16.

In the foregoing way, infrared pickup device 24 continually monitors the temperature of the molten puddle 16; and when this temperature rises to the point where there is danger of an incipient blow-through, pickup device 24 produces a monitoring-signal that is applied to an amplifier 28. At power-supply 22, the control signal from amplifier 28 modifies the operation of the power supply in such a way that the power applied to the arc is reduced. Since, in fusion welding, the weld-puddle 16 is constantly moving relative to the workpiece, there is a short instant of time during which the weld-puddle is approaching a different, cooler area of the workpiece, even though it is approaching the blow-through stage. It is this short instant of time that permits the pickup device 24 and the power supply 22 to cooperate, and to reduce the amount of power in the weld; thus reducing the temperature of the moving weld-puddle 16; preventing the danger of a blow-through; and producing consistent weld-penetration —this being a closed-loop type of operation.

As previously indicated, in fusion welding the molten puddle 16 moves progressively along the workpiece; the means of achieving this movement depending upon the size of the workpiece. If the workpiece is relatively small, the welding equipment is ordinarily fixedly-positioned, and the workpiece is moved past the welding electrode. If, on the other hand, the workpiece is relatively large, the workpiece is fixedly-positioned and the welding apparatus is moved along the workpiece, as indicated in FIG. 2. Here, this is achieved as follows. The welding equipment moves longitudinally, being guided by a skate 30, and being driven by a motor 32 having a pinion gear 34 that is engaged with a rack 36. In this way, electrode 20 moves along workpiece 23, producing a moving weld-puddle 16. The infrared pickup device is rigidly mechanically mounted by means of a bridging linkage 38, relative to the welding apparatus, so that the pickup device 24 constantly monitors the temperature of the back portion of the moving alternatively, 16. Alternatively the pickup arrangement may be mounted on its own skate, and driven by its own motor, to track the electrode movement by means such as disclosed in copending patent application Ser. No. 558,805, entitled "-Welding Apparatus" filed Jun. 20, 1966 by Fletcher R. Sullivan.

Pickup device 24 detects minute changes in temperature of the weld-puddle, and produces a monitoring-signal that changes in proportion to the deviation of the actual temperature from a desired temperature established by temperature control 39; and this monitoring-signal is used to modify the operation of the welding power-supply. The power-supply, in turn, changes the current applied to the electrode.

It has been determined that if the thickness of the workpiece decreases slowly and gradually, the temperature of the weld-puddle tends to rise slowly; and the arc-current must be gradually decreased to avoid a blow-through. Conversely, if the workpiece thickness increases gradually, the arc-current must be gradually increased to maintain proper weld-puddle temperature. In those cases where the workpiece thickness changes suddenly, a rapid change of arc-current is necessary; and this result is most readily obtained by using an amplifier that has an exponential-type output; that is, an amplifier whose output changes disproportionately with large changes of its input. Thus, in order to correlate the overall operation, amplifier 28 has an input-output characteristic that permits the monitoring-signal from pickup 24 to suitably control the current flow from power supply 22. In this way, as the temperature of the weld-puddle changes, the circuit produces a compensating change in power applied to the weld.

Successful operation of the invention described herein has employed equipment comprising a Mark I Model 3-1402 Infrascope manufactured by Huggin's Laboratory, Inc. of Sunnyvale, California; a Weltronic Arc Welding Control 0600-6313, manufactured by Weltronic Corporation of Detroit, Michigan; and a Model C TIG arc welding automatic constant-arc voltage control manufactured by Air Reduction Corporation of Union, New Jersey.

In fusion welding, there are a number of parameters that contribute to the quality of the weld. These parameters include the welding current, the welding voltage, the rate of wire-feed in the TIG process, the rate of electrode-feed in the MIG process, the uniformity of the pressure holding the two pieces of materials together, etc. Since all of these parameters contribute to the quality of the weld, it has previously been thought essential to control all of the various parameters. Unfortunately, some of them cannot be easily controlled; and many of them are interdependent. Therefore, most prior-art methods attempted to stabilize as many parameters as possible, under the assumption that if these were held constant the resultant weld would be of satisfactory quality. However, because of the variability of the parameters and their cross-effects, parameter control does not always produce the desired satisfactory welds.

It has been found that monitoring and controlling the weld-puddle temperature tends to minimize the need for controlling all of the above parameters, since controlling the weld-puddle temperature accomplishes the same effect directly as controlling the parameters attempts to do in a secondary manner. Moreover, while the disclosed apparatus was primarily designed to prevent overpenetration of the weld, it inherently also prevents weld underpenetration; and, the overall weld quality is tremendously improved by the described apparatus.

FIG. 3 shows a schematic presentation of the present invention used with welding arrangement of the MIG type. Here, electrode 40 is of the consumable type; and is mounted in well-known apparatus 42 that advances or retracts the consumable-electrode relative to the workpiece in order to obtain a desired arc-length. Since —in MIG welding —the electrode is consumed as part of the welding process, it is ordinarily advanced at a fixed rate to maintain arc-length, is advanced at an accelerated rate to reduce arc-length, is held stationary to let the electrode-consumption slowly increase arc-length, and is retracted to quickly increase arc-length. In operation, the embodiment of FIG. 3 operates in a manner similar to that previously described. Infrared pickup device 24, which is of course mechanically rigidly connected to electrode 24 as discussed previously, produces a monitoring-signal that is applied to amplifier 28. In distinction to the previously described equipment, however, in the disclosed MIG arrangement the control signal from amplifier 28 is applied to the electrode-feeding mechanism, 42, which controls the arc-length, and thus the arc power and the temperature of weld-puddle 16.

If the temperature of weld-puddle 16 increases to the point where there is danger of a blow-through, the IR pickup device 24 produces a temperature-deviation signal that is amplified by amplifier 28; and a control signal from the amplifier is applied to the electrode-feeding mechanism 42. This mechanism in turn decreases the electrode feed-rate, and thus the current flowing through the arc. Thus, less power is applied to weld-puddle 16, and the danger of a blow-through is removed.

Under those conditions where the weld-puddle becomes too cool, a deviation signal of the opposite sense is produced by pickup device 24, and is applied to amplifier 28, whose control signal is applied to electrode-feeding mechanism 42, which in turn increases the electrode feed-rate. This permits a larger current flow, thus raising the temperature of the weld-puddle. In this way, the weld-puddle is maintained at the desired temperature for obtaining consistent weld penetration.

There are times —particularly when extremely large or odd-shaped workpieces are involved—when it is impracticable to place the infrared pickup device on the back side of the workpiece, and still have it rigidly mounted relative to the welding apparatus. In situations such as this, the arrangement of FIG. 4 is used. While the foregoing welding operations have been presented in terms of arc welding, FIG. 4 shows an arrangement for gas welding. Here a welding torch 46 obtains its gases from a gas source 48, each type of gas passing through a suitable electromechanical valve 50, 52. Pickup device 24 is mounted on the same side of the workpiece as the welding torch 46, and they are mechanically connected together for simultaneous movement by a suitable connecting structure 47.

The operation is the same as previously described; that is pickup device 24 continually monitors the temperature of the weld-puddle 16, but now monitors the temperature at the front surface. As previously indicated, it is undesirable for pickup device 24 to be affected by the visible light in the flame, and therefore it is carefully designed to monitor a small area of the weld-puddle, and to be shielded from any stray visible radiations in that general area. The output of the pickup device 24 is amplified, and a control signal from amplifier 28 is applied to the valves 50, 52 to control the flow of gas; and to thus control the temperature of the weld-puddle.

While the front-mounted monitoring apparatus has been shown in connection with flame welding, it may of course be used to monitor the front surface of a weld-puddle produced by arc welding; and a similar technique can be used with electron-beam and laser welding.

Although the invention has been described and illustrated in detail, it is to be clearly understood that the same is by way of illustration and example only, and is not to be taken by way of limitation; the spirit and scope of this invention being limited only by the terms of the appended claims.

We claim:

1. A method for fusion welding a workpiece to control weld penetration, comprising the steps of:
    supplying power to and heating an area on one side of said workpiece in which a fusion weld is to be formed forming a weld-puddle;
    causing the heated area to move relative to the workpiece, so that the point of formation of said weld-puddle moves relative to the workpiece;
    sensing the heat output emanating from the other side of the workpiece at the point thereon at which the moving weld-puddle is being formed by sensing a predetermined band of wavelengths in the infrared region and cutting off visual wavelengths; and
    controlling the power input to the moving weld-puddle in accordance with the heat output from the opposite side of said weld-puddle within the specified band sensed by the sensor to maintain consistent penetration of the weld at a predetermined value.

2. The method of claim 1 wherein said heating step comprises establishing an arc between a non combustible electrode and said workpiece, and said power-controlling step comprises controlling the current in said arc.

3. The method of claim 1 wherein said heating step comprises establishing an arc between a combustible electrode and said workpiece, and said power-controlling step comprises controlling the arc-length.

4. The method of claim 1 wherein said heating step comprises application of heat by a welding torch, and said power-controlling step comprises controlling the flow of gas to said torch.

5. A method for controlling on a workpiece a welding operation that continuously produces a weld-puddle on one side of the workpiece which puddle moves relative to the workpiece, in order to attain improved penetration and prevent blow-through, comprising the steps of:
    monitoring the temperature of said workpiece at a point disposed on the opposite side thereof from said moving weld-puddle;

producing a monitoring signal when said temperature changes from a given value; and causing said monitoring signal to control the power input to said moving weld-puddle to minimize the danger of blow-through.

6. The combination of claim 5 wherein said monitoring signal is amplified to produce a control signal indicative of the change in temperature of said moving weld-puddle; and causing said control signal to control the power applied to said weld-puddle.

7. The combination of claim 5 wherein said temperature monitoring comprises the measurement of infrared radiation from a small area of said moving weld-puddle.

8. The combination of claim 7 wherein said power input depends upon the arc-current, and said control signal controls said arc-current.

9. The combination of claim 7 wherein said power input depends upon the arc-length, and said control signal controls said arc-length.

10. The combination of claim 7 wherein said control signal controls the flow of gas to a welding torch.